United States Patent
Smith et al.

(10) Patent No.: US 10,686,906 B2
(45) Date of Patent: Jun. 16, 2020

(54) METHODS FOR MANAGING MULTI-LEVEL FLASH STORAGE AND DEVICES THEREOF

(71) Applicant: NetApp, Inc., Sunnyvale, CA (US)

(72) Inventors: Mark Smith, Cupertino, CA (US); Brian Naylor, Raleigh, NC (US); Naresh Patel, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 148 days.

(21) Appl. No.: 15/144,392

(22) Filed: May 2, 2016

(65) Prior Publication Data

US 2017/0318114 A1    Nov. 2, 2017

(51) Int. Cl.
  *G06F 15/16*    (2006.01)
  *H04L 29/08*    (2006.01)
  *H04L 29/06*    (2006.01)

(52) U.S. Cl.
  CPC ...... *H04L 67/2842* (2013.01); *H04L 67/1097* (2013.01); *H04L 67/42* (2013.01)

(58) Field of Classification Search
  CPC . H04L 67/2842; H04L 67/1097; H04L 67/42; H04L 29/08; H04L 29/06
  See application file for complete search history.

(56) References Cited

U.S. PATENT DOCUMENTS

| | | | | |
|---|---|---|---|---|
| 8,321,630 B1* | 11/2012 | Vaid | ................... | G06F 12/0871 711/104 |
| 8,549,222 B1 | 10/2013 | Kleiman et al. | | |
| 8,769,196 B1* | 7/2014 | Sadhu | ................. | G06F 12/0868 711/100 |
| 8,825,937 B2* | 9/2014 | Atkisson | ............ | G06F 12/0246 711/102 |
| 9,372,825 B1 | 6/2016 | Shee | | |
| 9,582,421 B1* | 2/2017 | Agarwala | ........... | G06F 12/0253 |
| 9,608,936 B1* | 3/2017 | Mehrotra | ................ | H04L 49/25 |
| 10,282,107 B1* | 5/2019 | Martin | .................. | G06F 3/0611 |
| 2010/0281230 A1* | 11/2010 | Rabii | .................... | G06F 3/0605 711/165 |
| 2010/0325352 A1* | 12/2010 | Schuette | ............... | G06F 3/0613 711/103 |

(Continued)

OTHER PUBLICATIONS

Updike, P., "Flash Pool Design and Implementation Guide", Technical Report, May 2012, TR-4070, NetApp, Inc.

(Continued)

*Primary Examiner* — Cheikh T Ndiaye
(74) *Attorney, Agent, or Firm* — Pepper Hamilton LLP

(57) ABSTRACT

A method, non-transitory computer readable medium and storage controller computing device that receives a read request from a client device. Data corresponding to the read request is retrieved from a flash cache comprising local flash memory. The data is returned to the client device in response to the read request. A determination is made when the data is stored in a flash pool. The flash pool comprises a plurality of solid state drives (SSDs). The data is inserted into the flash pool, when the determining indicates that the data is not stored in the flash pool. With this technology, a flash pool is populated based on hits in a flash cache. Accordingly, flash cache is utilized to provide low latency reads while the most important data is preserved in the flash pool to be used by another storage controller computing device in the event of a failover.

20 Claims, 6 Drawing Sheets

(56) References Cited

U.S. PATENT DOCUMENTS

| | | | | |
|---|---|---|---|---|
| 2011/0145489 A1* | 6/2011 | Yu | ........................ | G06F 3/0613 |
| | | | | 711/103 |
| 2012/0110247 A1* | 5/2012 | Eleftheriou | ......... | G06F 12/0246 |
| | | | | 711/103 |
| 2012/0110259 A1* | 5/2012 | Mills | ....................... | G06F 13/00 |
| | | | | 711/113 |
| 2013/0024650 A1* | 1/2013 | Ambat | .................... | G06F 3/061 |
| | | | | 711/209 |
| 2014/0297982 A1* | 10/2014 | Duzett | ................. | G06F 3/0613 |
| | | | | 711/165 |
| 2015/0378888 A1* | 12/2015 | Zhang | ................ | G06F 12/0246 |
| | | | | 711/103 |
| 2016/0283394 A1* | 9/2016 | Chahal | ................. | G06F 3/0604 |
| 2017/0123988 A1* | 5/2017 | Chun | ................. | G06F 12/0862 |

OTHER PUBLICATIONS

Shapiro, S., "Flash Cache and Best Practice Guide", Technical Report, Nov. 2013, TR-3832, NetApp Inc.

* cited by examiner

METHODS FOR MANAGING MULTI-LEVEL FLASH STORAGE AND DEVICES THEREOF

FIELD

This technology relates to data storage networks, and more particularly to methods and devices for managing multi-level flash storage in a data storage network.

BACKGROUND

In many storage networks, storage controller computing devices share a plurality of data storage devices in a cluster or array that may be hosted by a shelf or other enclosure. The storage controller computing devices may be cooperating to provide high availability or other storage services for the storage network. As one particular example, the storage controller computing devices may be a high availability (HA) pair of storage controllers that utilize an array of data storage devices hosted by one or mores shelves in a Fibre-attached storage (FAS) architecture.

In order to improve performance, storage controller computing devices can include a cache that can be comprised of flash memory, referred to herein as a flash cache. The cache can be populated by data that is read from the data storage devices of the storage array. Recently read data has an increased likelihood of being accessed again. Accordingly, in a subsequent access, the data in a flash cache can be served from the local, high performance, low latency flash cache allowing a requesting client device to obtain the data faster.

However, flash caches are generally expensive, limited in size, and in some implementations are maintained based on an age-based eviction policy such that data accessed more often is not more likely to be maintained in the cache any longer than data accessed less often. Moreover, in the event of a storage controller computing device failure, the flash cache is not accessible by another storage controller computing device (e.g., the other storage controller computing device in an HA pair). Accordingly, following a failover, operations on data previously maintained in a flash cache will require significantly more latency than may be expected while the flash cache on another storage controller computing device is populated.

As an alternate way of improving performance, storage arrays can include a plurality of solid state drives (SSDs), referred to herein as a flash pool, in addition to hard disk drives (HDDs). The SSDs can be flash-based and provide relatively low latency and insertion cost as compared to the HDDs, allowing some of the data stored in a file system to be accessed relatively quickly. The data stored on the SSDs can be the most recently used or accessed data in the file system, for example.

SSDs can advantageously be accessed by other storage controller computing devices (e.g., another storage controller computing device in an HA pair) in the event of a failover. However, insertion cost and latency are higher for a flash pool than for a flash cache. While the flash pool can store a relatively large amount of data as compared to a flash cache, many blocks of data inserted into the flash pool are never subsequently read from the flash pool, resulting in wasted resources required to facilitate the insertion.

DETAILED DESCRIPTION

Figure 1:
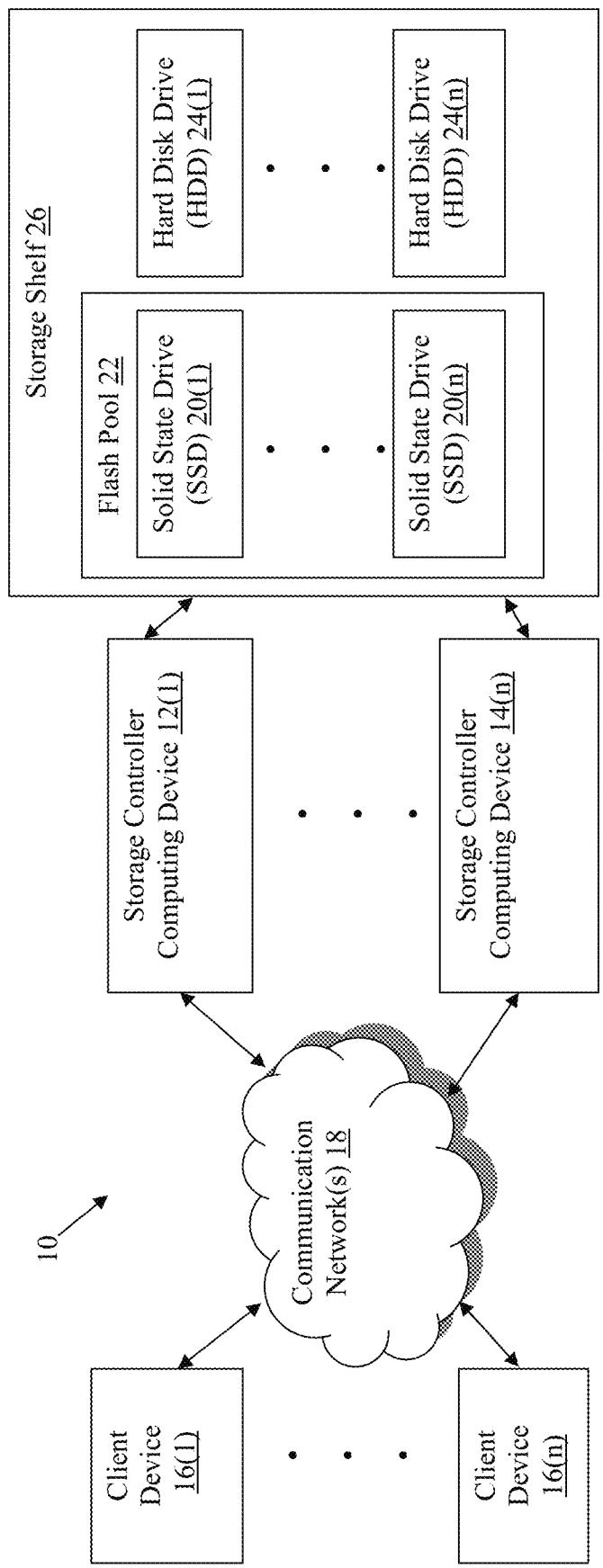
FIG. 1 is a block diagram of a network environment with a plurality of exemplary storage controller computing devices each including a flash cache coupled to a shelf hard disk drives (HDDs) a flash pool of solid state drives (SSDs)

A network environment 10 including exemplary storage controller computing devices 12(1)-12(n) is illustrated in FIG. 1. The storage controller computing devices 12(1)-12(n) are coupled to client devices 16(1)-16(n) via communication network(s) 18 and solid state drives (SSDs) 20(1)-20(n) of a flash pool 22 and hard disk drives (HDDs) 24(1)-24(n), that are hosted by a shelf 26, via a bridge and/or switch (not shown), although this network environment 10 can include other numbers and types of systems, devices, components, and/or elements in other configurations. Additionally, the network environment 10 may include other network devices such as one or more routers and/or switches, for example, which are well known in the art and thus will not be described herein. This technology provides a number of advantages including methods, non-transitory computer readable media, and devices that more effectively manage multi-level flash storage to reduce flash pool insertion cost, reduce latency for client devices, and improve access to relatively important data subsequent to a failover.

Figure 2:
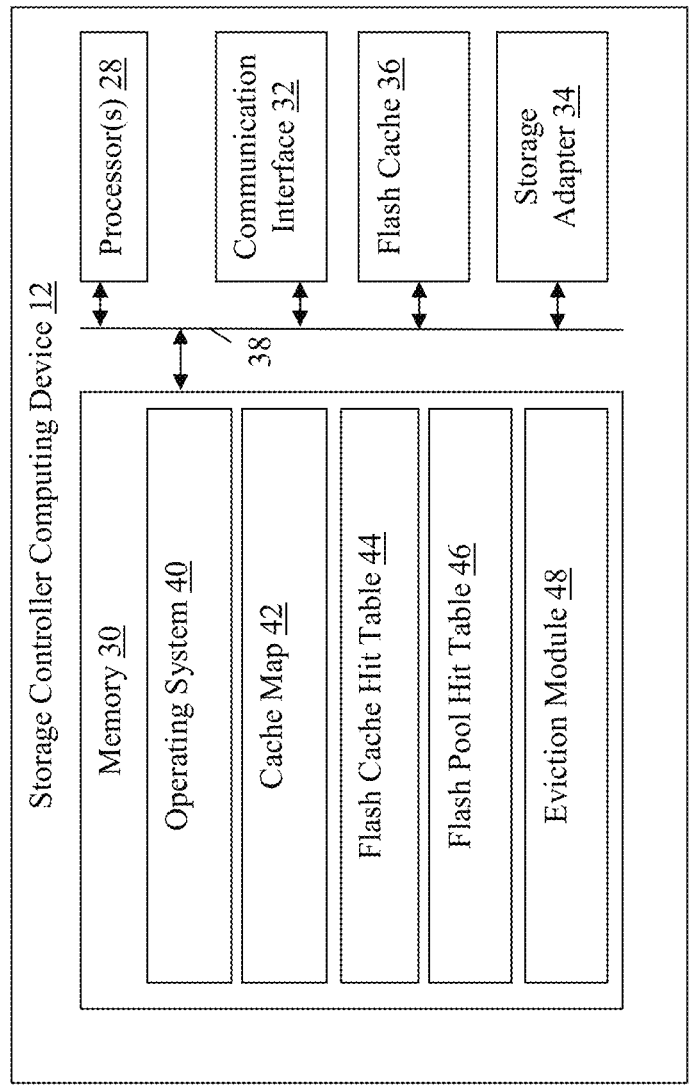
FIG. 2 is a block diagram of one of the exemplary storage controller computing devices shown in FIG. 1.

Referring to FIG. 2, a block diagram of one of the exemplary storage controller computing devices 12(1)-12(n) is illustrated. The storage controller computing device 12 generally provides file services relating to the organization of information in a file system on the SSDs 20(1)-20(n) and HDDs 24(1)-24(n) on behalf of the client devices 16(1)-16(n). In this example, the storage controller computing device 12 includes processor(s) 28, a memory 30, a communication interface 32, a storage adapter 34, and a flash cache 36, which are coupled together by a bus 38 or other communication link.

The processor(s) 28 of the storage controller computing device 12 may execute a program of stored instructions for one or more aspects of the this technology, as described and illustrated by way of the embodiments herein, although the processor(s) 28 could execute other numbers and types of programmed instructions. The processor(s) 28 in the storage controller computing device 12 may include one or more central processing units (CPUs) or general purpose processors with one or more processing cores, for example.

The memory 30 of the storage controller computing device 12 may include any of various forms of read only memory (ROM), random access memory (RAM), flash memory, non-volatile or volatile memory, or the like, or a combination of such devices, for example. In this example, the memory 30 includes an operating system 40, a cache map 42, an optional flash cache hit table 44, a flash pool hit table 46, and an eviction module 48, although other types and/or numbers of applications or modules can also be included in other examples.

The operating system 40 is configured to functionally organize stored data by invoking storage operations to facilitate file services provided by the storage controller computing device 12. In particular, the operating system 40 implements a file system to logically organize information as a hierarchical structure of directories and files on the SSDs 20(1)-20(n) and HDDs 24(1)-24(n). The operating system 38 cooperates with the storage adapter 34 to access information requested by the client devices 16(1)-16(n) and stored on the flash cache 36, SSDs 20(1)-20(n), or HDDs 24(1)-24(n), for example.

The cache map 42 including an indication of the storage location of data (e.g., blocks or files) with respect to whether the data is stored in the flash cache 36 and/or the flash pool 22, for example. Accordingly, the operating system 40 can access the cache map 42 in response to a read operation or request received from one of the client devices 16(1)-16(n) in order to determine whether the data corresponding to the request is stored in the flash cache 36 or the flash pool 22, as described and illustrated in more detail later. In other examples, separate maps or other data structures can be used to determine whether data is stored in the flash cache 36 and/or the flash pool 22.

The flash cache hit table 44 can be any data structure storing an indication of a number of times data (e.g. a block or a file) that is stored in the flash cache 36 has been accessed from the flash cache 36 by one or more of the client devices 16(1)-16(n), which is referred to herein as a flash cache hit count. Accordingly, the flash cache hit table 44 reflects how "hot" data in the flash cache 36 is, which corresponds to the likelihood that the data will be accessed by one of the client devices 16(1)-16(n) in the future.

Similarly, the flash pool hit table 46 can be any data structure storing an indication of a number of times data (e.g. a block or a file) that is stored in the flash pool 22 has been accessed from the flash pool 22 by one or more of the client devices 16(1)-16(n), which is referred to herein as a flash pool hit count. Accordingly, the flash pool hit table 46 reflects how "hot" data in the flash pool 22 is, which corresponds to the likelihood that the data will be accessed by one of the client devices 16(1)-16(n) in the future. In another example, one or more of the flash cache hit table 44 or flash pool hit table 46 can be maintained at a per-block level in metadata associated with the block, for example, and other methods for maintaining the flash cache hit table 44 or flash pool hit table 46 can also be used.

The eviction module 48 in this example is configured to determine whether data should be evicted from the flash cache 36 and/or the flash pool 22. Various eviction policies can be implemented by the eviction module 48, as described and illustrated in more detail later. The eviction policies can require that the eviction module 48 determine whether data should be evicted from the flash cache 36 and/or the flash pool 22 based on a periodic time period or a capacity of the flash cache 36 and/or the flash pool 22, for example, although other methods for determining when to evict data can also be used by the eviction module 48.

The communication interface 32 of the storage controller computing device 12 can include one or more network interface controllers (NICs) for operatively coupling and communicating between the storage controller computing device 12 and the client devices 16(1)-16(n), which are coupled together by the communication network(s) 18, although other types and numbers of communication networks or systems with other types and numbers of connections and configurations to other devices and elements also can be used.

By way of example only, the communication network(s) 18 can use TCP/IP over Ethernet and industry-standard protocols, including NFS, CIFS, SOAP, XML, LDAP, and SNMP, although other types and numbers of communication networks, can be used. The communication network(s) 18 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 18 may also comprise any local area network and/or wide area network (e.g., Internet), although any other type of traffic network topologies may be used.

The storage adapter 34 can cooperate with the operating system 40 to access information requested by the client devices 16(1)-16(n). The information may be stored on the SSDs 20(1)-20(n) and/or HDDs 24(1)-24(n) in logical volumes, for example. The storage adapter 34 includes input/output (I/O) or communication interface circuitry that couples the storage controller computing device 12 to the SSDs 20(1)-20(n) and/or HDDs 24(1)-24(n) over an I/O interconnect arrangement such as a conventional high-performance, Fibre Channel serial link topology, SAS, SCSI, or SATA, for example.

The flash cache 36 is a local flash memory configured to store data recently accessed by one or more of the client devices 16(1)-16(n) from the file system maintained by the SSDs 20(1)-20(n) and HDDs 24(1)-24(n). The flash cache 36 facilitates lower latency than the SSDs 20(1)-20(n) and HDDs 24(1)-24(n) and has a lower associated insertion and retrieval cost, but is more expensive and relatively smaller in size than the SSDs 20(1)-20(n) and HDDs 24(1)-24(n). The flash cache 36 can be hosted by a PCIe card attached to the bus 38, for example, although other types of components or arrangements can also be used. In this particular example, the flash cache 36 is not accessible to another storage controller computing device in the event of a failure of the storage controller computing device 12, although the flash cache 36 can be accessible to another storage controller computing device in other examples.

Referring back to FIG. 1, each of the client devices 16(1)-16(n) in this example includes a processor, a memory, a communication interface, and optionally an input device and a display device, which are coupled together by a bus or other link, although each of the client devices 16(1)-16(n) can have other types and numbers of components or other elements and other numbers and types of network devices could be used. The client devices 16(1)-16(n) may run interface applications that provide an interface to make requests for and send content and/or data to the storage controller computing device 12 via the communication network(s) 18, for example. Each of the client devices 16(1)-16(n) may be a conventional personal computer, a tablet computing device, a smart phone, a virtual machine running in a cloud, an application server hosting applications that utilize backend storage, or other processing and/or computing device, for example.

The SSDs 20(1)-20(n) and/or HDDs 24(1)-24(n) collectively comprise a storage cluster or array that together store a file system presented to the client devices 16(1)-16(n) and managed by the operating system 40. The storage controller computing devices 12(1)-12(n) in this particular example further support FCP and iSCSI with respect to interactions with the SSDs 20(1)-20(n) and/or HDDs 24(1)-24(n), although other protocols can be used in other examples. The SSDs 20(1)-20(n) collectively comprise the flash pool 22 and can be flash-based drives in an all flash array, for example, although other types of storage can be used for the SSDs 20(1)-20(n). The SSDs 20(1)-20(n) have higher insertion and retrieval costs than the flash cache 36, but lower insertion and retrieval costs than the HDDs 24(1)-24(n). Accordingly, the SSDs 20(1)-20(n) can be used to store data in the file system that is relatively likely to be accessed by the client devices 16(1)-16(n), as described and illustrated in more detail later.

The SSDs 20(1)-20(n) and HDDs 24(1)-24(n) optionally host one or more volumes based on a Redundant Array of Inexpensive Disks (RAID) architecture or other topology facilitating data persistency, although other types and numbers of volumes in other topologies can also be used. Additionally, other types of stable, non-volatile storage suitable for storing files or objects in storage volumes for short or long term retention can also be included in the network environment 10 in other examples.

In this example, the SSDs 20(1)-20(n) and HDDs 24(1)-24(n) are located at slots in the shelf 26, although any number of shelves can be used. While the shelf 26 is illustrated in FIG. 1 as being separate from the storage controller computing devices 12(1)-12(n), the SSDs 20(1)-20(n) and/or HDDs 24(1)-24(n) can also be hosted by a same enclosure, rack, or cabinet as one or more of the storage controller computing devices 12(1)-12(n), for example, and the SSDs 20(1)-20(n) and/or HDDs 24(1)-24(n) can also be located elsewhere in the network environment 10. In this particular example, the SSDs 20(1)-20(n) are external to the storage controller computing devices 12(1)-12(n) and can therefore be accessed by either of the storage controller computing devices 12(1)-12(n) in the event of a failure of one of the storage controller computing devices 12(1)-12(n).

Although examples of the storage controller computing devices 12(1)-12(n), client devices 16(1)-16(n), and storage shelf 26, are described and illustrated herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples also may be embodied as one or more non-transitory computer readable media having instructions stored thereon for one or more aspects of the present technology, as described and illustrated by way of the examples herein, which when executed by the processor, cause the processor to carry out the steps necessary to implement the methods of this technology, as described and illustrated with the examples herein.

Figure 3:
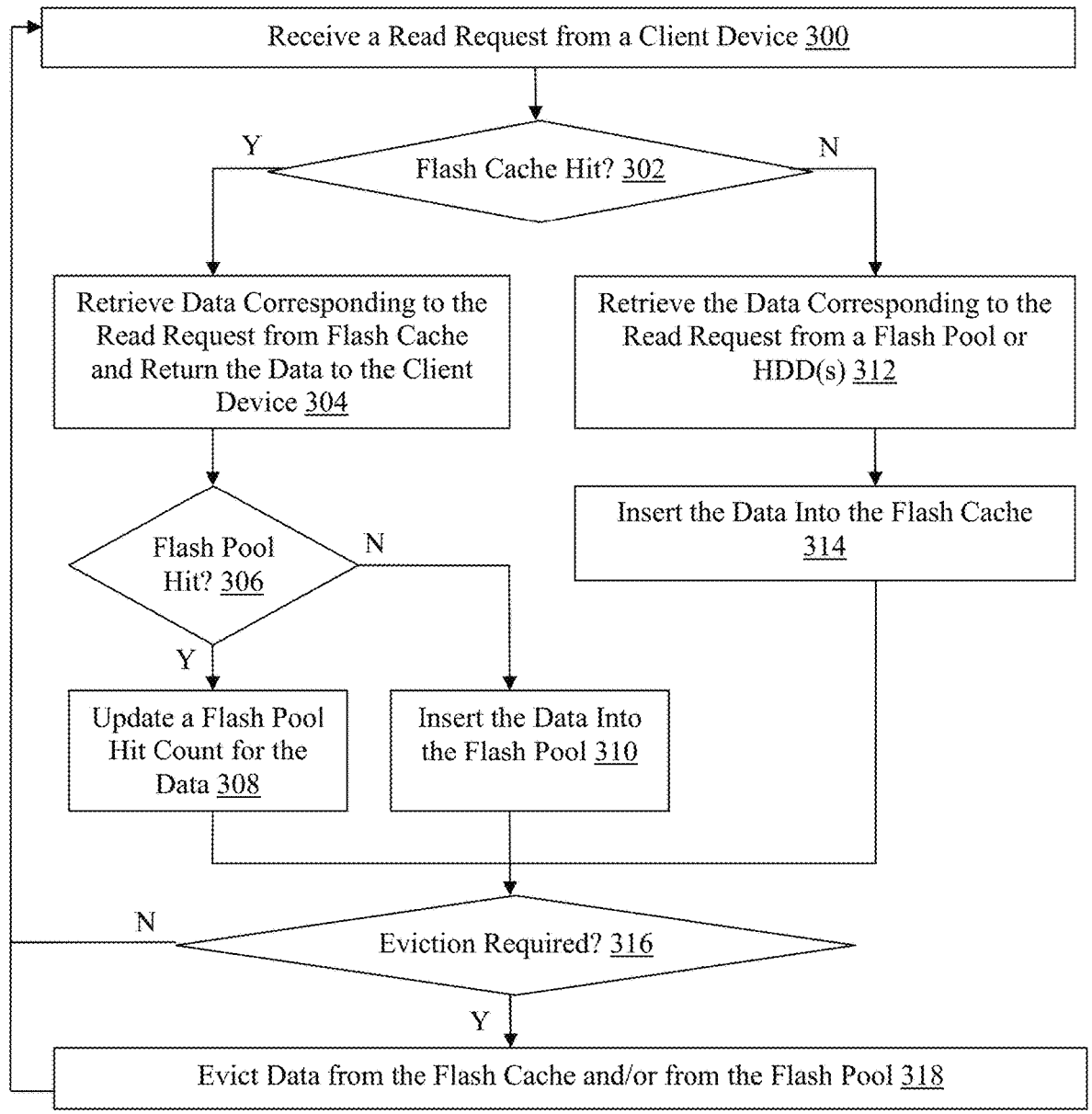
FIG. 3 is a flowchart of an exemplary method for managing multi-level flash storage.

An exemplary method for managing multi-level flash storage will now be described with reference to FIGS. 1-6. Referring more specifically to FIG. 3, in step 300, one of the storage controller computing devices 12(1)-12(n) receives a read request or storage operation from one of the client devices 16(1)-16(n). The read request identifies data that the one of the client devices 16(1)-16(n) is attempting to access and the data can correspond with a block, file, or other organizational structure of data maintained by the file system stored by the SSDs 20(1)-20(n) and HDDs 24(1)-24(n).

In step 302, the one of the storage controller computing devices 12(1)-12(n) determines whether there is a hit in the flash cache 36. In order to determine whether there is a hit in the flash cache 36, indicating that the data corresponding to the read request is currently available from the flash cache 36, the one of the storage controller computing devices 12(1)-12(n) can compare an indication of the data included in the read requested to the cache map 42, although other methods of determining whether there is a hit can also be used. If the one of the storage controller computing devices 12(1)-12(n) determines that there is a hit in the flash cache 36, then the Yes branch is taken to step 304.

In step 304, the one of the storage controller computing devices 12(1)-12(n) retrieves the data corresponding to the read request from the flash cache 36 and returns the data to the one of the client devices 16(1)-16(n) in response to the read request received in step 300. The data could have been previously stored in the flash cache as described and illustrated in more detail later with reference to step 314, although other methods of populating the flash cache 36 can also be used. By servicing the read request from the flash cache 36, the data can be returned to the one of the client devices 16(1)-16(n) relatively quickly.

In step 306, the one of the storage controller computing devices 12(1)-12(n) determines whether there is a hit in the flash pool 22. In order to determine whether there is a hit in the flash pool 22, indicating that the data corresponding to the read request is currently stored in the flash pool 22, the one of the storage controller computing devices 12(1)-12(n) can compare an indication of the data included in the read request to the cache map 42, although other methods of determining whether there is a hit can also be used. If the one of the storage controller computing devices 12(1)-12(n) determines that there is a hit in the flash pool 22, then the Yes branch is taken to step 308.

In step 308, the one of the storage controller computing devices 12(1)-12(n) updates a flash pool hit count associated with the data in the flash pool hit table 46. The flash pool hit count for the data can be established as described and illustrated in more detail later with reference to step 310. In another example, the flash pool hit count for the data can be stored elsewhere, such as in metadata associated with the data on one or more of the SSDs 20(1)-20(n), for example.

By updating the flash pool hit count associated with the data, the data will be less likely to be evicted (e.g., to one or more of the HDDs 24(1)-24(n)) by the eviction module 48, as described and illustrated in more detail later. Since the data was recently accessed, there is a greater likelihood that the data will be accessed in the future. Accordingly, by updating the flash pool hit count associated with the data, and increasing the time that the data will remain in the flash pool 22 prior to being evicted, subsequent read requests for the data can be serviced relatively quickly from the flash pool 22. Additionally, the data can be provided with lower latency subsequent to a failure of the one of the storage controller computing devices 12(1)-12(n) because the flash pool 22 is accessible to another of the storage controller computing devices 12(1)-12(n) in the event of such a failure.

Referring back to step 306, if the one of the storage controller computing devices 12(1)-12(n) determines that there is not a hit in the flash pool 22, then the No branch is taken to step 310. In step 310, the one of the storage controller computing devices 12(1)-12(n) inserts the data into one or more of the SSDs 20(1)-20(n) of the flash pool 22. The one of the storage controller computing devices 12(1)-12(n) also sets a default hit count for the data in the flash pool hit table 46, and optionally updates the cache map 42 to reflect the insertion of the data into the flash pool 22.

By inserting the data into the flash pool 22 only after it was accessed from the flash cache 36, this technology only populates the flash pool 22 with data that has an increased likelihood of being accessed in the future. Accordingly, this technology effectively uses the flash cache 36 as a filter for storing data in the flash pool 36, and thereby reduces insertion cost waste with respect to the flash pool 22. In this particular example, data is inserted into the flash pool 22 after a single hit or access of the data in the flash cache 36. However, the one of the storage controller computing devices 12(1)-12(n) can be configured to require a specified number of hits in the flash cache 36 prior to inserting the data into the flash pool 36, as described and illustrated in more detail later with reference to FIG. 6.

Referring back to step 302, if the one of the storage controller computing devices 12(1)-12(n) determines that there is not a hit in the flash cache 36 for the data corresponding to the read request received in step 300, then the No branch is taken to step 312. In step 312, the one of the storage controller computing devices 12(1)-12(n) retrieves the data corresponding to the read request from one or more of the SSDs 20(1)-20(n) of the flash pool 22 or one or more of the HDDs 24(1)-24(n). In this particular example, if the data is retrieved from the flash pool 22 in step 312, then the retrieved data was previously stored in the flash cache 36, but already evicted from the flash cache 36. Since the flash pool 22 is significantly larger than the flash cache 36, data previously in the flash cache 36 can still be serviced relatively quickly (e.g., with respect to the HDDs 24(1)-24(n)) and for a longer period of time from one or more of the SSDs 20(1)-20(n) of the flash pool 22 in this example.

In step 314, the one of the storage controller computing devices 12(1)-12(n) inserts the data into the flash cache 36. The one of the storage controller computing devices 12(1)-12(n) also optionally updates the cache map 42 to reflect the insertion of the data into the flash cache 36. Optionally, one or more policies can also be applied by the one of the storage controller computing devices 12(1)-12(n) to limit the types or number of data that is inserted into the flash cache 36 in step 314.

Since the data was retrieved from the flash pool 22 or HDDs 24(1)-24(n), it is relatively likely to be accessed in the future. By storing the data in the flash cache 36, the data can be provided in response to a subsequent request for the data relatively quickly as compared to servicing the request from the flash pool 22 or HDDs 24(1)-24(n), for example.

Subsequent to updating the flash pool hit count for the data in step 308, inserting the data into the flash pool 22, or inserting the data into the flash cache 36 in step 314, the storage controller computing devices 12(1)-12(n) proceeds to step 316. In step 316, the one of the storage controller computing devices 12(1)-12(n) executing the eviction module 48 determines whether any data should be evicted from the flash cache 36 or the flash pool 22.

The eviction module 48 can be configured to scan the flash cache 36 and/or flash pool 22 periodically in order to determine whether an eviction is require, or the eviction module 48 can be configured to determine that eviction is required based on the flash cache 36 or the flash pool 22 exceeding a threshold storage capacity, for example, and other policies can also be applied by the eviction module 48 to determine whether an eviction is required. If the one of the storage controller computing devices 12(1)-12(n) determines that an eviction is required, then the Yes branch is taken to step 318.

In step 318, the one of the storage controller computing devices 12(1)-12(n) evicts data from the flash cache 36 and/or flash pool 22, such as to one or more of the SSDs 20(1)-20(n) or one or more of the HDDs 24(1)-24(n), respectively. In other examples, the data can be evicted without being subsequently stored elsewhere. In these examples, a copy of the data stored on one or more of the HDDs 24(1)-24(n), for example, can be inserted into the flash cache 36 in step 314, for example, so that the data is still maintained in the file system upon eviction in step 318.

In this particular example, the eviction module 48 is configured to evict data from the flash cache 36 based on a first-in-first-out (FIFO) policy and to evict data from the flash pool 22 based on a least recently used (LRU) policy, although other types and numbers of policies can be used in other examples. Accordingly, in this example, data will be evicted from the flash cache 36 based on age, and irrespective of the number of time the data was used or accessed by one or more of the client devices 16(1)-16(n). Since data is evicted from the flash pool 22 based on an LRU policy in this particular example, updating the flash pool hit count for data inserted into the flash pool 22 advantageously delays eviction for the data most likely to be accessed again by one or more of the client devices 16(1)-16(n), as described and illustrated in more detail earlier.

Subsequent to evicting data from one or more of the flash cache 36 or flash pool 22 in step 318, or if the one of the storage controller computing devices 12(1)-12(n) determines in step 316 that eviction is not required and the No branch is taken, then the one of the storage controller computing devices 12(1)-12(n) proceeds back to step 300 and receives another read request from one of the client devices 16(1)-16(n). One or more of steps 302-314 can be performed by the one of the storage controller computing devices 12(1)-12(n) in parallel for any number of read requests received from any number of the client devices 16(1)-16(n). Additionally, the eviction process described and illustrated in detail earlier with reference to steps 316-318 can be performed by the one of the storage controller computing devices 12(1)-12(n) in parallel with any of steps 300-314.

Figure 4:
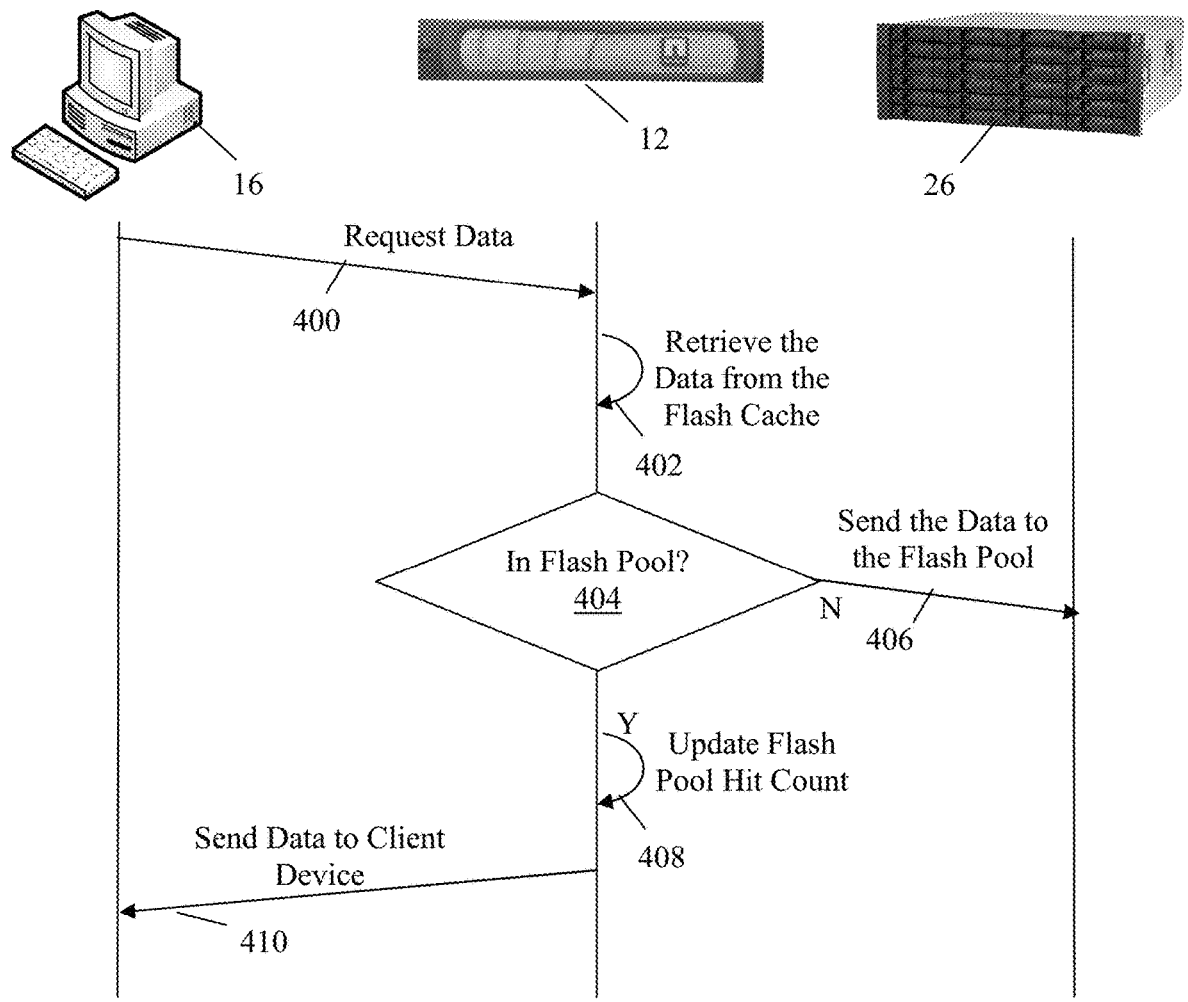
FIG. 4 is a timing diagram of an exemplary method for managing multi-level flash storage when requested data is stored in a flash cache.

Referring more specifically to FIG. 4, a timing diagram of an exemplary method for managing multi-level flash storage when requested data is stored in the flash cache 36 is illustrated. In step 400 in this example, the client device 16 sends a request for data (e.g., a file) to the storage controller computing device 12. In step 402, the storage controller computing device 12 retrieves the data (e.g., one or more blocks or a file) from the flash cache 36. Accordingly, in this example, the storage controller computing device 12 determined that there was a hit in the flash cache 36 for the requested data.

In step 404, the storage controller computing device 12 determines whether the requested data is stored in the flash pool 22. If the storage controller computing device 12 determines that the data is not in the flash pool 22, then the No branch is taken to step 406. In step 406, the storage controller computing device 12 sends the data to the flash pool 22 hosted by the storage shelf 26 for storage in one or more of the SSDs 20(1)-20(n).

Accordingly, the flash pool 22 in this example is populated with data accessed from the flash cache 36, which has been accessed multiple times is therefore relatively likely to be accessed in the future. With this technology, the flash pool 22 is advantageously populated with the "hottest" data previously stored in, and accessed from, the flash cache 36, instead of data that was merely accessed once from one or more of the HDDs 24(1)-24(n).

Referring back to step 404, the storage controller computing device 12 determines that the data is in the flash pool 22, then the Yes branch is taken to step 408. In step 408, the storage controller computing device 12 updates a flash pool hit count for the data (e.g., in flash pool hit table 46) in order to extend the length of time that the data will remain in the flash pool 22 before being evicted. In step 410, the storage controller computing device 12 sends the data to the client device 16in response to the request, although the data can also be sent by the storage controller computing device 12 any time after performing step 402.

Figure 5:
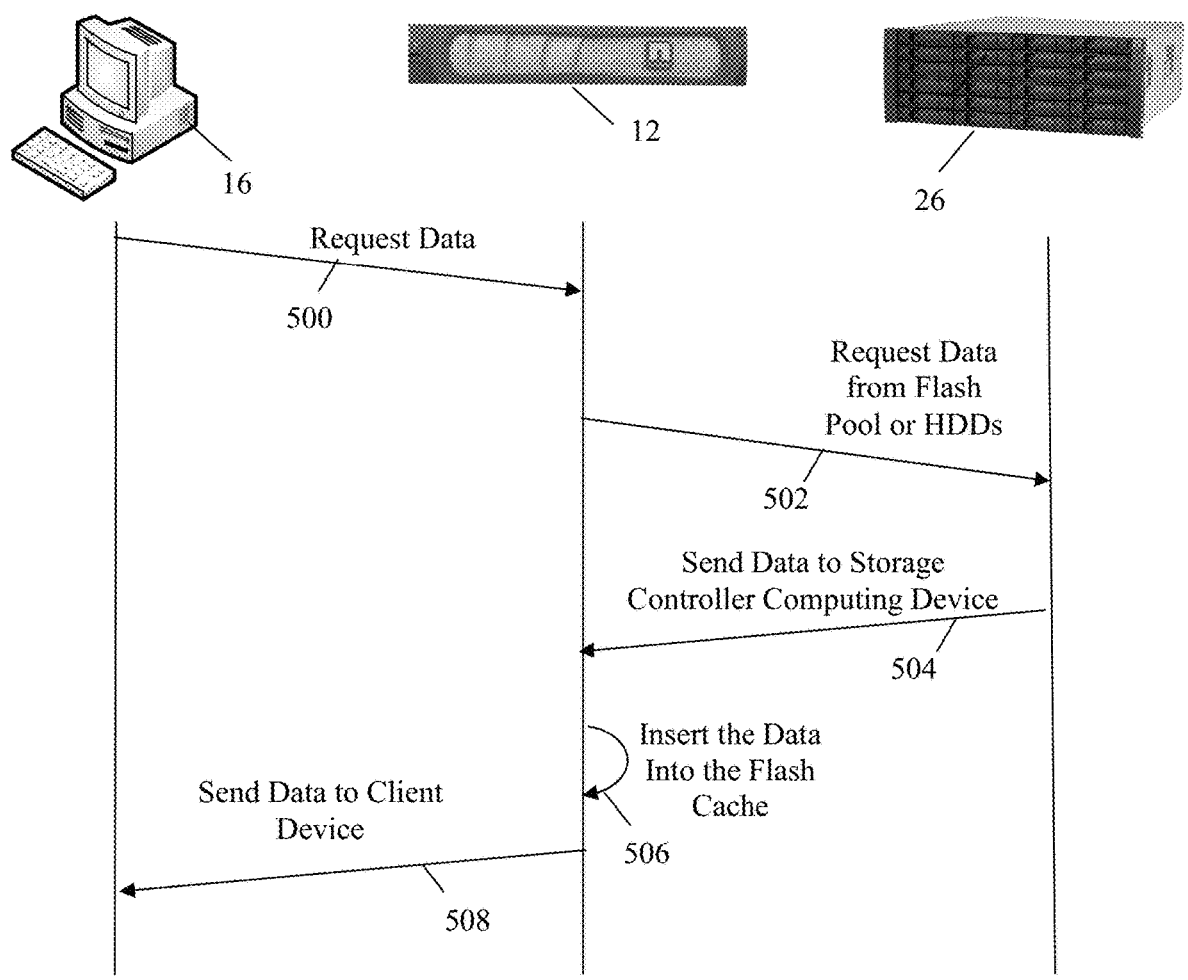
FIG. 5 is a timing diagram of an exemplary method for managing multi-level flash storage when requested data is not stored in a flash cache.

Referring more specifically to FIG. 5, a timing diagram of an exemplary method for managing multi-level flash storage when requested data is not stored in the flash cache 36 is illustrated. In step 500 in this example, the client device 16 sends a request for data (e.g., a file) to the storage controller computing device 12. In step 502, the storage controller computing device 12 requests the data (e.g., one or more blocks or a file) from storage shelf 26 and, in particular, one or more of the SDDs 20(1)-20(n) of the flash pool 22 or one or more of the HDDs 24(1)-24(n). Accordingly, in this example, the storage controller computing device 12 determined that there was not a hit in the flash cache 36 for the requested data.

In step 504, the storage shelf 26 sends the requested data to the storage controller computing device 12. In step 506, the storage controller computing device 12 inserts the data into the flash cache 36. Since the data was recently requested, it is more likely to be requested again in the future and is therefore inserted into the flash cache 36 to facilitate low latency service of any subsequent request for the data. In step 508, the storage controller computing device 12 sends the data to the client device 16 in response to the request, although the data can also be sent to the client device 16 prior to being inserted in the flash cache 36 in step 506.

Figure 6:
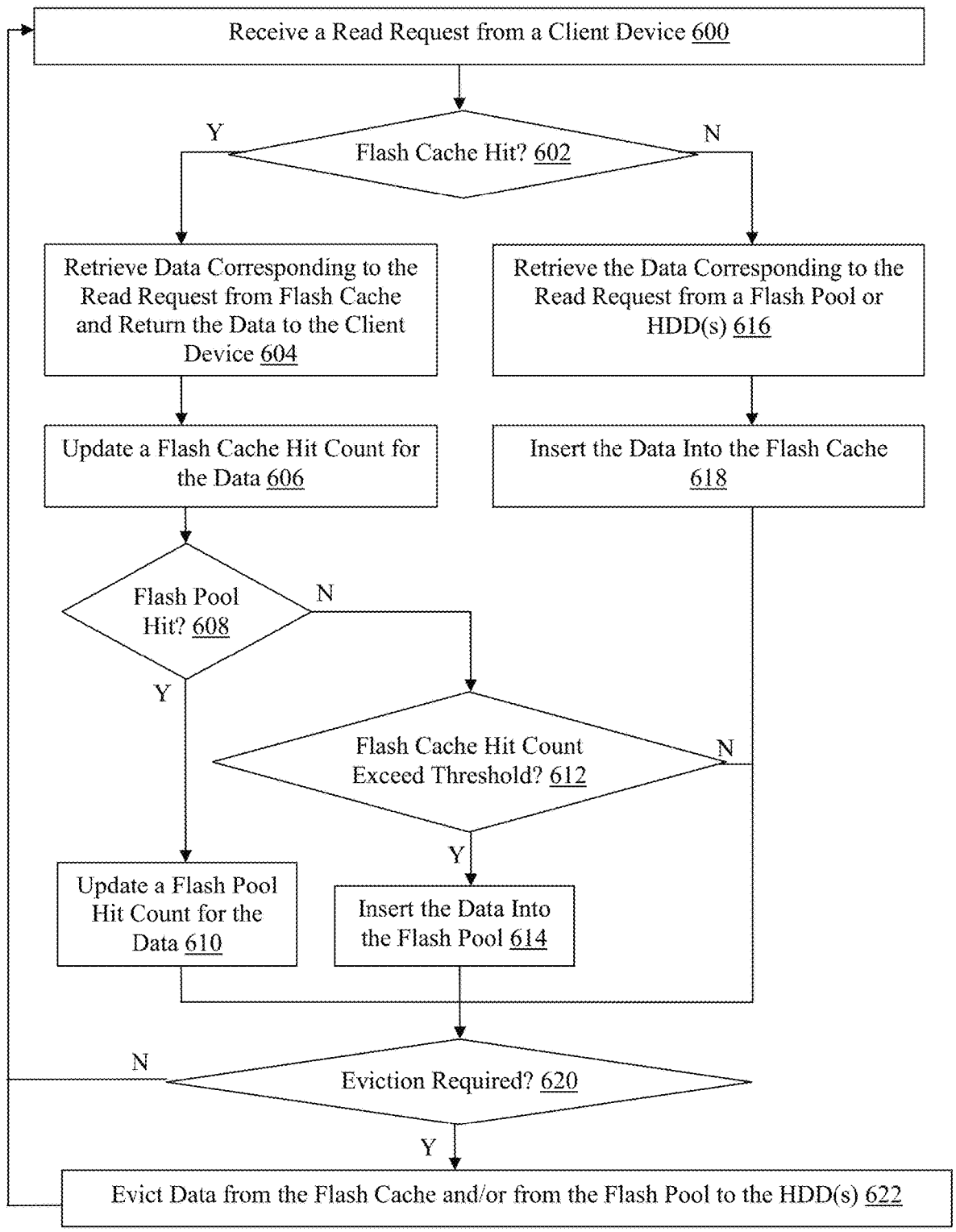
FIG. 6 is a flowchart of an exemplary method for managing multi-level flash storage by populating a flash pool with data having an increased likelihood of subsequent access.

Referring more specifically to FIG. 6, a flowchart of an exemplary method for managing multi-level flash storage by populating a flash pool with data having an increased likelihood of subsequent access is illustrated. In this particular example, steps 600, 602, and 604 proceed as described and illustrated earlier with reference to steps 300, 302, and 304 of FIG. 3, respectively.

However, in step 606, one of the storage controller computing devices 12(1)-12(n) updates a flash cache hit count associated with the data requested in step 600 in the flash cache hit table 44. The flash cache hit count for the data can be established as described and illustrated in more detail later with reference to step 620. In another example, the flash cache hit count for the data can be stored elsewhere, such as in metadata associated with the data and stored in the flash cache 36, for example.

In step 608, the one of the storage controller computing devices 12 determines whether there is a hit in the flash pool 22 for the data, as described and illustrated in more detail earlier with reference to steps 306 of FIG. 3. If the one of the storage controller computing devices 12(1)-12(n) determines that there is a hit in the flash pool 22 for the data, then the Yes branch is taken to step 610 and the one of the storage controller computing devices 12(1)-12(n) updates a flash pool hit count associated with the data, as described and illustrated in more detail earlier with reference to step 308 of FIG. 3.

However, if the one of the storage controller computing device 12(1)-12(n) determines in step 608 that there is not a hit in the flash pool, then the No branch is taken to step 612. In step 612, the one of the storage controller computing devices 12(1)-12(n) determines whether the flash cache hit count associated with the data (e.g., in the flash cache hit table 44) exceeds an established threshold hit count. The threshold can be established by an administrator of the one of the storage controller computing devices 12(1)-12(n) and stored in the memory 30, for example, and can be a static or dynamic value. If the one of the storage controller computing devices 12(1)-12(n) determines that the flash cache hit count associated with the data exceeds the established threshold, then the Yes branch is taken to step 614.

In step 614, the one of the storage controller computing devices 12(1)-12(n) inserts the data into the flash pool 22 (e.g., on one or more of the SSDs 20(1)-20(n)), as described and illustrated in more detail earlier with reference to step 310 of FIG. 3. Accordingly, in this particular example, the one of the storage controller computing device 12(1)-12(n) is configured to insert only data that has been accessed by one or more of the client devices 16(1)-16(n) a threshold number of times into the flash pool 22. Therefore, the flash pool 22 in this example is populated with only the "hottest" data that has been accessed a threshold number of times and has an increased likelihood of being accessed again, thereby reducing the insertion cost waste with respect to the flash pool 22.

As indicated earlier, step 602 in this example proceeds as described and illustrated earlier with reference to step 302 of FIG. 3, and step 616 also proceeds as described and illustrated earlier with reference to step 312 of FIG. 3. In step 618, the one of the storage controller computing devices 12(1)-12(n) inserts the data into the flash cache 36, as described and illustrated in more detail earlier with reference to step 314 of FIG. 3. Additionally, in this particular example, the one of the storage controller computing devices 12(1)-12(n) also sets a default flash cache hit count associated with the data, that can be updated as described and illustrated earlier with reference to step 606.

Subsequent to inserting the data into the flash cache 36 in step 618, updating the flash pool hit count for the data in step 610, inserting the data into the flash pool 22 in step 614, or it the one of the storage controller computing devices 12(1)-12(n) determines that the flash cache hit count for the data does not exceed the established threshold in step 612 and the No branch is taken, then the one of the storage controller computing devices 12(1)-12(n) proceeds to step 620. Steps 620 and 622 in this example proceed as described and illustrated earlier with reference to steps 316 and 318 of FIG. 3.

As with the example described and illustrated earlier with reference to FIG. 3, one or more of steps 602-618 can be performed by the one of the storage controller computing devices 12(1)-12(n) in parallel for any number of read requests received from any number of the client devices 16(1)-16(n). Additionally, the eviction process in steps 620-622 can be performed by the one of the storage controller computing devices 12(1)-12(n) in parallel with any of steps 600-618.

With this technology, SSDs of a flash pool are populated with data (e.g., block(s) or file(s)) that have an increased likelihood of being subsequently accessed by a client device. In particular, a flash cache that has relatively low insertion cost advantageously filters data such that only data accessed from the flash cache is subsequently inserted into the flash pool that has a relatively high insertion cost. Accordingly, the insertion cost of the flash pool is only incurred for data that has been accessed multiple, or a threshold number of, times. Therefore, this technology reduces insertion cost waste, as well as latency for client devices, particularly following a failover.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
    inserting, by a computing device, data corresponding to a read request into a cache of the computing device, wherein the data is retrieved from one or more hard disk drives (HDDs);
    determining, by the computing device, when a cache hit count associated with the data retrieved from the cache in response to a subsequent read request exceeds a threshold, wherein the data is maintained in the cache subsequent to the insertion and the cache hit count comprises a number of times the data is accessed from the cache;
    storing, by the computing device, a copy of the data on one or more solid state drives (SSDs) of a storage pool that is separate from the cache, when the determination indicates that the cache hit count exceeds the threshold, wherein the storage pool comprises a lower performance tier than the cache and a higher performance tier than the HDDs; and
    servicing, by the computing device, one or more additional read requests for the data from the SSDs of the storage pool following eviction of the data from the cache.

2. The method of claim 1, further comprising updating, by the computing device, a storage pool hit count associated with the data subsequent to servicing the additional read requests for the data from the storage pool.

3. The method of claim 2, further comprising evicting, by the computing device, the data from the SSDs to another one or more of the HDDs based on the storage pool hit count.

4. The method of claim 1, further comprising inserting, by the computing device, other data retrieved from the storage pool into the cache, when the other data is determined to be stored in the storage pool based on a lack of an indication of the other data in a cache map.

5. The method of claim 1, wherein the SSDs of the storage pool and the HDDs are hosted by a storage shelf, and coupled to the computing device via an input/output (I/O) interconnect, and the cache is coupled to a system bus of the computing device.

6. The method of claim 1, wherein the storage pool has higher insertion and retrieval costs and higher latency than the cache and lower insertion and retrieval costs and lower latency than the HDDs.

7. A non-transitory machine readable medium having stored thereon instructions for managing multi-level storage comprising machine executable code which when executed by at least one machine causes the machine to:
    insert data corresponding to a first read request into a cache of the machine, wherein the data is retrieved from one or more hard disk drives (HDDs);
    determine when a cache hit count associated with the data retrieved from the cache in response to a subsequent read request exceeds a threshold, wherein the data is maintained in the cache subsequent to the insertion and the cache hit count comprises a number of times the data is accessed from the cache;
    store a copy of the data on one or more solid state drives (SSDs) of a storage pool that is separate from the cache, when the determination indicates that the cache hit count exceeds the threshold, wherein the storage pool comprises a lower performance tier than the cache and a higher performance tier than the HDDs; and
    service one or more additional read requests for the data from the SSDs of the storage pool following eviction of the data from the cache.

8. The non-transitory machine readable medium of claim 7, wherein the machine executable code when executed by the machine further causes the machine to update a storage pool hit count associated with the data subsequent to servicing the additional read requests for the data from the storage pool.

9. The non-transitory machine readable medium of claim 8, wherein the machine executable code when executed by the machine further causes the machine to evict the data from the SSDs to another one or more of the HDDs based on the storage pool hit count.

10. The non-transitory machine readable medium of claim 7, wherein the machine executable code when executed by the machine further causes the machine to insert other data retrieved from the storage pool into the cache, when the other data is determined to be stored in the storage pool based on a lack of an indication of the other data in a cache map.

11. The non-transitory machine readable medium of claim 7, wherein the SSDs of the storage pool and the HDDs are hosted by a storage shelf, and coupled to the computing device via an input/output (I/O) interconnect, and the cache is coupled to a system bus of the computing device.

12. The non-transitory machine readable medium of claim 7, wherein the storage pool has higher insertion and retrieval costs and higher latency than the cache and lower insertion and retrieval costs and lower latency than the HDDs.

13. A computing device, comprising:
    a memory containing machine readable medium comprising machine executable code having stored thereon instructions for managing multi-level storage; and
    a processor coupled to the memory, the processor configured to execute the machine executable code to cause the processor to:
    insert data corresponding to a first read request into a cache of the computing device, wherein the data is retrieved from one or more hard disk drives (HDDs);
    determine when a cache hit count associated with the data retrieved from the cache in response to a subsequent read request exceeds a threshold, wherein the data is maintained in the cache subsequent to the insertion and the cache hit count comprises a number of times the data is accessed from the cache;
    store a copy of the data on one or more solid state drives (SSDs) of a storage pool that is separate from the cache, when the determination indicates that the cache hit count exceeds the threshold, wherein the storage pool comprises a lower performance tier than the cache and a higher performance tier than the HDDs; and
    service one or more additional read requests for the data from the SSDs of the storage pool following eviction of the data from the cache.

14. The computing device of claim 13, wherein the processor is further configured to execute the machine executable code to further cause the processor to update a storage pool hit count associated with the data subsequent to servicing the additional read requests for the data from the storage pool.

15. The computing device of claim 14, wherein the processor is further configured to execute the machine executable code to further cause the processor to evict the data from the SSDs to another one or more of the HDDs based on the storage pool hit count.

16. The computing device of claim 13, wherein the processor is further configured to execute the machine executable code to further cause the processor to insert other data retrieved from the storage pool into the cache, when the other data is determined to be stored in the storage pool based on a lack of an indication of the other data in a cache map.

17. The computing device of claim 13, wherein the SSDs of the storage pool and the HDDs are hosted by a storage shelf, and coupled to the computing device via an input/output (I/O) interconnect, and the cache is coupled to a system bus of the computing device.

18. The computing device of claim 17, wherein the SSDs of the storage pool and the HDDs collectively host a file system comprising the data and the storage shelf hosting the SSDs of the storage pool and the HDDs is accessible by one or more other computing devices in a failover arrangement with the computing device.

19. The computing device of claim 13, wherein the storage pool has higher insertion and retrieval costs and higher latency than the cache and lower insertion and retrieval costs and lower latency than the HDDs.

20. The computing device of claim 13, wherein eviction from the flash cache is based on a first in first out policy and eviction from the flash pool is based on a least recently used (LRU) policy.

* * * * *